United States Patent [19]

Barnard

[11] Patent Number: 4,949,311

[45] Date of Patent: Aug. 14, 1990

[54] SINGLE LASER DIRECT READ AFTER WRITE SYSTEM (DRAW)

[75] Inventor: James A. Barnard, Conesus, N.Y.

[73] Assignee: Eastman Kodak Company, Rochester, N.Y.

[21] Appl. No.: 274,578

[22] Filed: Nov. 22, 1988

[51] Int. Cl.$^5$ .............................................. G11B 7/00
[52] U.S. Cl. ....................................... 369/54; 369/116
[58] Field of Search ................. 346/108, 76 L, 135.1; 369/53–58, 112, 109, 116, 59; 358/342; 360/53

[56] References Cited

U.S. PATENT DOCUMENTS

| | | | |
|---|---|---|---|
| 4,345,261 | 8/1982 | Wilkinson | 358/342 X |
| 4,571,716 | 2/1986 | Szerlip | 369/54 |
| 4,599,717 | 7/1986 | Bracht et al. | 369/59 X |
| 4,694,447 | 9/1987 | Cohen et al. | 369/112 X |

*Primary Examiner*—Robert L. Richardson

*Attorney, Agent, or Firm*—Edward Dugas

[57] ABSTRACT

A single laser system utilizes a grating to provide a shifted beam and a nonshifted beam which are directed through a polarized beamsplitter in the nonsplitting direction. The beams are directed through a ¼ wave plate by means of a folding mirror. The beams from the ¼ wave plate are focused onto the recording surface to generate a write spot and a DRAW (direct read after write) spot. The DRAW spot is positioned behind the write spot at a distance of n+½ bits. Reflections from the DRAW spot are collimated back through the ¼ wave plate onto the folding mirror. The folding mirror directs the collimated DRAW verify spot to the polarized beamsplitter where it is reflected through a lens to a DRAW spot photodetector for detection. In a like manner, read reflections are directed back to be focused on a read photodetector.

12 Claims, 3 Drawing Sheets

SINGLE LASER DIRECT READ AFTER WRITE SYSTEM (DRAW)

TECHNICAL FIELD OF THE INVENTION

The present invention relates to optical data storage systems and, more specifically, to a single laser direct read after write system.

BACKGROUND OF THE INVENTION

Optical data storage systems utilize a disk onto which is affixed a recording medium for storing information in digital form. An optical head powered by a laser writes data on a recording medium by ablating and/or otherwise deforming the recording mediums reflectivity. Reading of the data then takes place as a function of sensing the light reflected from the nonmodified surface and the laser deformed surface. The deformations correspond to bit values, generally in a code format which facilitates the packing of the bits into the recording track of the optical disk. During a read operation the laser beam's power is lowered to a read intensity level and the beam is directed onto the optical disk somewhat identically to the beam that was used in the write mode. A detector within the system detects reflected light passing back through the systems optics and the detected signal is converted to an electrical signal the magnitude of which is a function of the reflection from the individual bit positions on the surface of the optical disk. To insure data integrity, it is necessary to verify the accuracy of the write operation to determine whether or not data was properly written to the individual bit positions. Two general verification techniques are known within the art. One is that individual bit positions are read after they have been written. This usually occurs in a second revolution of the disk. The first revolution being dedicated to the writing of the bits and the second revolution being dedicated to the reading and the comparing of the read bits with the written bits. Multiple beam optical heads can be used to provide the write beam and the read beam with the two beams being spaced apart a distance from each other such that the read beam can be reading the data prior to the second complete revolution of the optical disk. Such a system is perfectly satisfactory other than the fact that two systems almost identical in nature are required and of course the associated expense is approximately double what is needed for a single beam system.

A second type of verification technique known as the direct read during write has received some usage. There characteristics are that after the write signal is turned on the write detect signals, monitored immediately thereafter, are analyzed to determine the reflected properties of the surface of the disk.

A patent of particular interest for setting forth the state of the art is U.S. Pat. No. 4,680,594 entitled "Single Beam Direct Read During Write and Write Protect System for Use in an Optical Data Storage System" by R. Bracht. The system described in that patent is a direct read during write. The system detects the reflected light from the reflective surface as the write laser burns away portions of the recording layer to expose a nonreflective surface. The light that is reflected is detected and its characteristics observed for a time delay period which period permits the laser, if in the burn mode, to physically accomplish the destruction of the reflected surface. Such being the case the reflected light will commence at a relatively high value and will decrease to the value experienced when the nonreflective surface is exposed. By comparing the received signal from the detector with the desired write or bit positions it is possible to perform an accurate check of the writing on the surface of the disk.

Another patent of interest for its teaching is U.S. Pat. No. 4,428,075 entitled "Methods of Preformatting an Optical Disk" by R. L. Hazel et al. In the apparatus of that patent a multiplicity of laser beams are used, including a read-before-write beam along with a read-after-write beam and three beams that are used to selectively write across the width of a track.

Another patent of interest is U.S. Pat. No. 4,622,564 entitled "Optical Information Recording Apparatus" by T. Kaku et al. The apparatus disclosed in the patent utilizes two semiconductor lasers to provide two spot beams on the surface of the disk which are separated by a fixed distance. The primary function of such a configuration is to provide an error check immediately after the writing operation. The aforementioned Patent is an example of the dual laser, one high power and one low power, systems which perform the reading function almost immediately after the write function.

SUMMARY OF THE INVENTION

In the apparatus of the present invention a laser outputs a single beam to a grating which grating separates the beam into two parallel spaced-apart beams that are directed to a folding mirror and to a quarter wave plate. An objective lens then focuses the beams onto the surface of a recording medium. The configuration is such that the DRAW (direct read after write) verify spot is positioned a distance behind the write spot. Reflections of the verify spot are directed back through the system to a photodetector to provide an indication of the status of the reflective surface of the recording disk.

From the foregoing it can be seen that it is primary object of the Present invention to provide an improved system for verifying that the write operation has been performed correctly.

It is another object of the present invention to provide a DRAW system utilizing a single laser source.

These and other objects of the present invention will become more apparent when taken in conjunction with the following description and drawings wherein like characters indicate like parts and which drawings form a part of the present description.

DESCRIPTION OF THE PREFERRED EMBODIMENT

Figure 1:
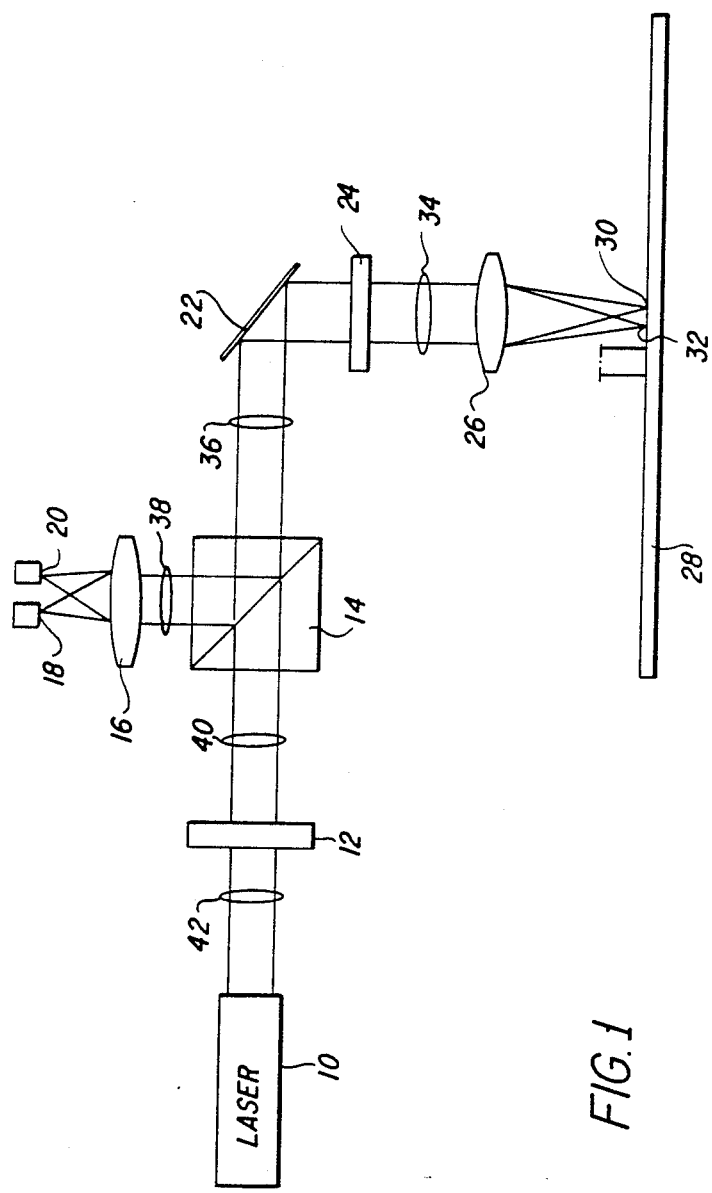
FIG. 1 is a schematic plan view of an apparatus according to the preferred embodiment of the invention.

Referring to FIG. 1, a laser 10 provides a collimated beam 42 which is directed towards and through a grating member 12. The grating member shifts portions of the beam 42 so as to form two, nearly parallel, beams both generally denoted 40. The grating is designed such that the ratio of power in the two resultant beams is large (approximately 10 to 1) so that the leading spot has enough power to mark the media and the trailing spot has insufficient power to mark the media. The beams are directed through a polarized beamsplitter 14 from the back direction so that the beams 40 are not split by the beamsplitting action. The emerging beams generally denoted 36 are reflected from a holding mirror 22 to a ¼ wave plate 24 and pass therethrough and are circularly polarized to provide the beams generally denoted 34. The beams are directed through an objective lens 26 and onto the recording surface of an optical disk 28. With appropriate means, not shown, the lens 26 is positioned from the recording surface of the disk 28 so as to form a first write spot 30 and a verify spot 32. The spots are spaced apart by $(n+\frac{1}{2})T$ where T is the write clock period, as discussed later, and n is an integer chosen so that the spacing is neither too large for the field of the lens nor to small to provide isolation of the reflected write spot from the DRAW (direct read after write) detector. Light reflected from the recording surface passes up through the objective lens 26 in a reverse direction and through the ¼ wave plate 24 onto the mirror 22 and to the reflecting surface of the beamsplitter 14. The reflected beams generally denoted 38 are directed to a lens 16 which lens focuses the verify signal spot onto a photodetector 20 and the read signal onto a photodetector 18.

Figure 2:
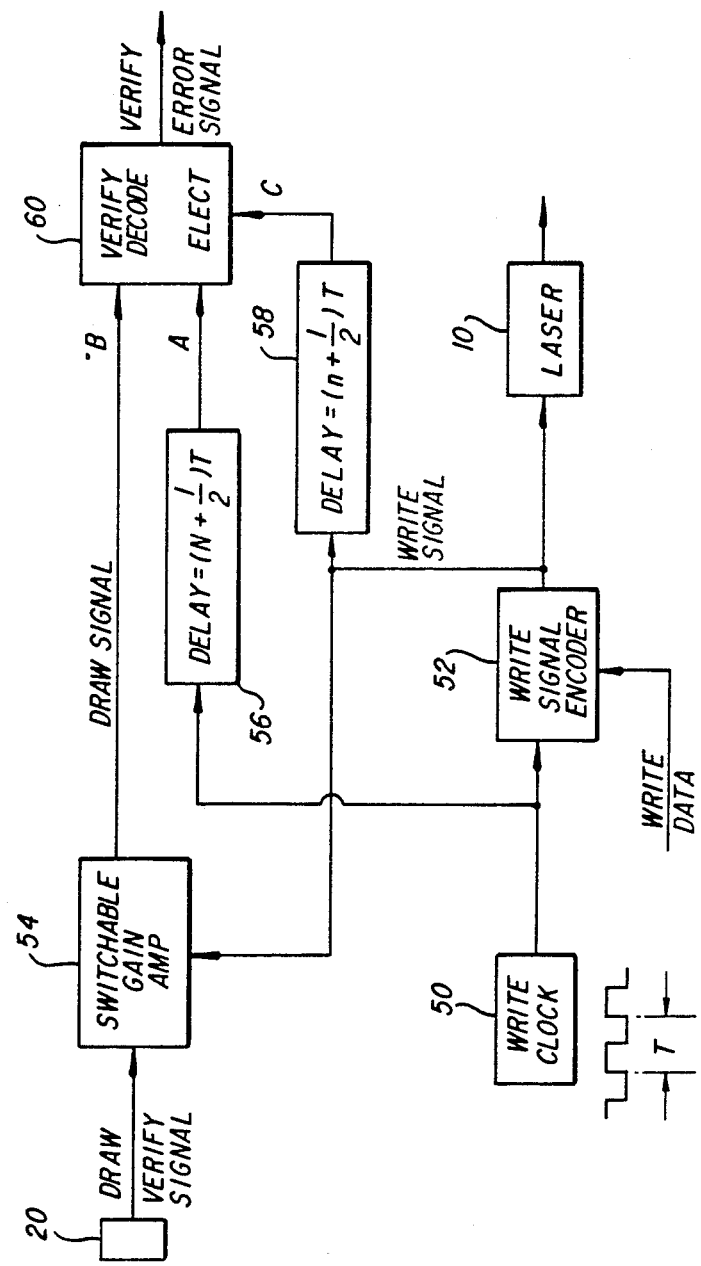
FIG. 2 is a block schematic diagram of the electronics operatively connected to the apparatus of FIG. 1.

Referring now to FIG. 2, the output of the verify photodetector 20 is coupled to the input of a switchable gain amplifier 54. The gain of amplifier 54 is a function of the magnitude of the signal received from a write signal encoder 52. The write encoder 52 receives write clocking pulses from the write clock circuit 50 as does a delay circuit 56. The write signal encoder 52 drives the laser 10 and also provides an input to a delay circuit 58. The laser is driven between a write power level and a read power level. The ratio between those two levels is typically 10 to 1. A verify decode circuit 60 receives the output signal from the switchable gain amplifier 54, which signal is labeled B, and the output signal from the delay circuit 56, which signal is labeled A, and the output signal from the delay circuit 58, which signal is labeled C. When an errors occurs, the verify decode circuit 60 outputs a signal corresponding to the existence of an error being detected in the write verify operation.

Figure 3:
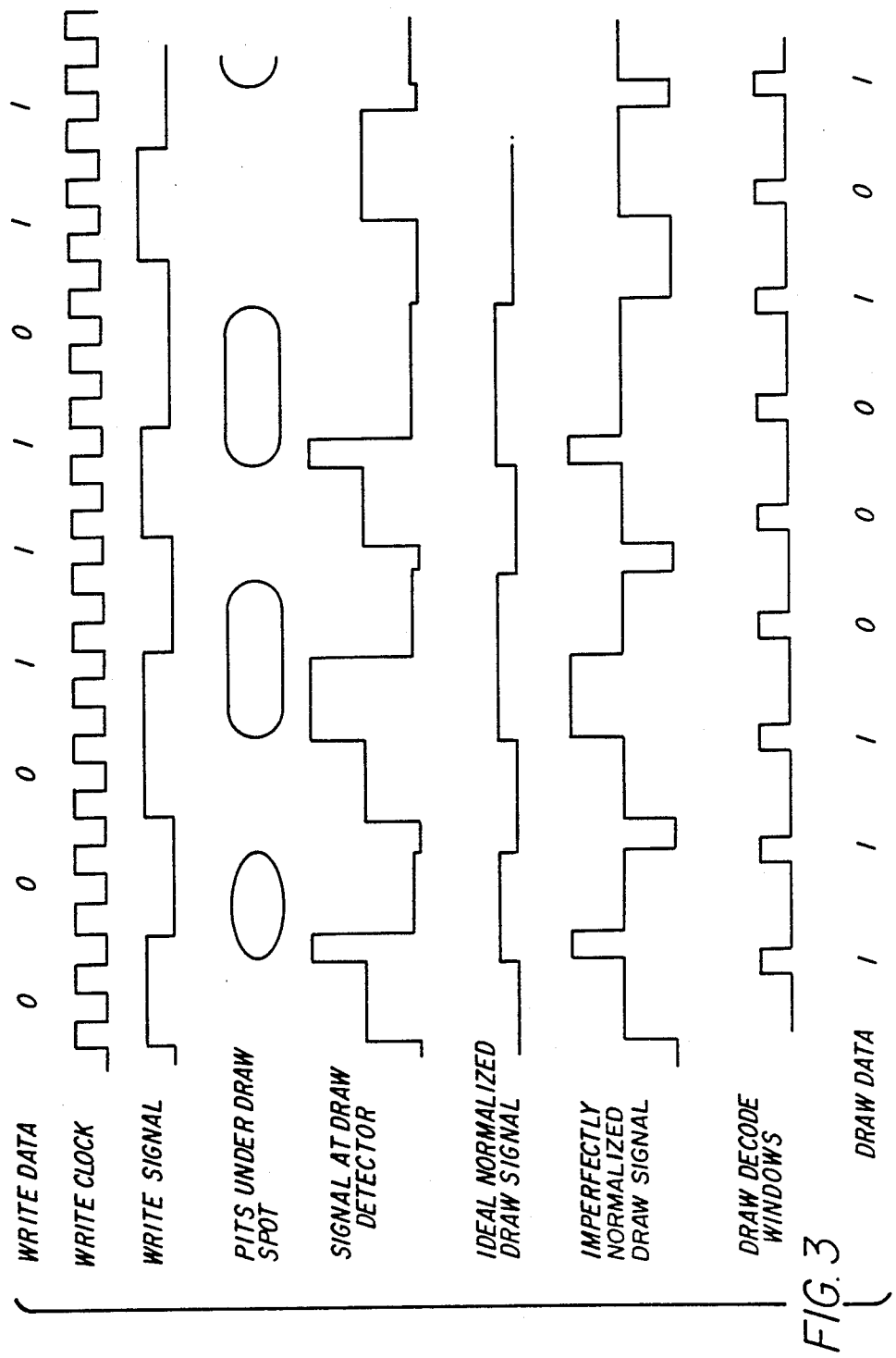
FIG. 3 is a group of waveforms taken from various locations within the electronics disclosed in FIG. 2.

Referring now to FIG. 3, in conjunction with the circuitry of FIG. 2, the write data appears in the first line of the drawings as zeros and ones and is shown encoded into a write signal using a write clock having a nominal cycle time equal to T. For Miller encoding there are two cycles of the write clock for each bit of data. The write signal drives the laser 10 to cause the power level of the laser to be modulated in a manner corresponding to the desired pit formation on the surface of the recording disk. Physically the pit formation corresponding to the write data for the first line is indicated as pits under the draw spot having the general configuration of ovals elongated and/or nonelongated. When the DRAW verify spot scans the newly created pits the signal appearing at the output of the detector 20 is shown as the signal at the draw detector output.

This signal is normalized by the switchable gain amplifier 54 which accommodates the difference in laser light levels between the write power level and the read power level. When the laser is at the write power level the gain amplifier 54 is in the low gain mode and when the laser is at the read power level gain amplifier 54 is in the high gain mode. The ratio between the gain in the two modes is ideally the same as the ratio between the write power and the read power levels.

If this normalization works perfectly the only transitions left in the normalized signal are those corresponding to pit edges. In that case, the decoding of this signal is accomplished with standard circuitry well-known in the art in a similar manner to the decoding of the read signal. However, a number of factors may cause the normalized DRAW signal to differ from the ideal case. These factors will tend to produce unwanted transitions in this signal coincident with the transitions in the laser power. The signal actually seen may then be presented by that shown in FIG. 3, labeled an "imperfectly normalized DRAW signal."

A run length limited code is used to encode the data to be recorded. Then transitions in the laser power can occur only in phase with the encoding write clock whose period is T. The transitions in the ideal DRAW verify signal can only occur in phase with the same clock but shifted by a time determined by the disk velocity and the spacing between the write and the DRAW verify spots on the disk surface. Therefore, for this application the spacing is chosen so as to correspond to a shift of $(n+\frac{1}{2})T$ where n is an integer. The laser power and the DRAW verify transitions are then separated in time by the largest amount possible, $\frac{1}{2}$ T.

The decoding of the DRAW verify signal is then accomplished by first gating the transition detecting circuitry to disallow transitions which occur too close to being in phase with the laser power transitions. The choice of how close to that to allow transitions will depend on the particular system being designed. For the example system, transitions within $\frac{1}{4}$ T of the write clock transitions are not allowed. After gating out those false transitions the resulting signal is then decoded using standard circuitry well-known in the art in a similar manner to the decoding of the read signal.

While there has been shown what is considered to be the preferred embodiment of the invention, it will be manifest that many modifications may be made therein without departing from the essential spirit of the invention. It is intended, therefore, in the annexed claims to cover all such changes and modifications as may fall within the true scope of the invention.

I claim:

1. A single laser direct read after write system comprising:
    a laser source for providing a first laser beam;
    means For generating two parallel laser beams from said first laser beam;
    means for focusing said two parallel laser beams spaced apart onto the recording track of a rotatable optical disk;
    write means for switching the energy level of said first laser beam between a write level and a read level to cause the first of said parallel laser beams to write on said recording track;
    detector means responsive to the reflections from the second of said parallel laser beams to provide a verify signal indicative of the writings on said recording track; and
    verify decode means for comparing the occurrence of the indicated writings of said verify signal to the occurred switching of said write means to the write level and for providing an error signal when such writing does not occur.

2. A single laser direct read after write system according to claim 1 wherein said means for generating two parallel laser beams is an optical grating.

3. A single laser direct read after write system according to claim 1 wherein said writing means is comprised of:
- a write clock source for providing a train of write pulses having a period cycle T; and
- a write signal encoder For receiving the train of write pulses from said write clock source and upon coincidence of a received write signal providing an encoder write signal to said laser source to cause said laser source to go to said write level.

4. A single laser direct read after write system according to claim 3 wherein said verify decode means excludes the transitions of said verify signal from occurring within a preselected time of the transition of the first laser beam between a write level and a read level.

5. A single laser direct read after write system according to claim 1 and further comprising:
- a switchable gain amplifier means connected to receive the verify signal from said detector means and having a low gain during a write operation and a high gain during a read operation and for providing its output signal to said verify decode means;
- delay means connected to said write means for providing a signal to said verify decode means which is delayed from the occurrence of a write operation by an amount of time equivalent to the spacing of the two laser beams on the recording track of the optical disk.

6. The single laser direct read after write system according to claim 5 wherein said delay means delays the provided signal by an amount equivalent to $(n+\frac{1}{2})T$, where n is an integer and where T is the cycle period of write pulses.

7. A single laser direct read after write system comprising:
- a laser source for generating a coherent light beam;
- a grating means positioned in the path of the generated light beam from said laser source for forming two substantially parallel coherent light beams;
- a polarized beamsplitter means positioned in the path of the two substantially parallel coherent light beams from said grating means;
- a quarter wave plate interposed in the path of the two substantially parallel coherent light beams passing through said polarized beamsplitter;
- an objective lens positioned to focus said two substantially parallel coherent light beams, passing through said quarter wave plate, onto the surface of a recording medium at two spaced-apart spots;
- write means coupled to said laser source for fixing the energy level of said coherent light beam to a first level to cause a change in the reflective surface of said recording surface at the first of the two spaced-apart spots for a write operation and for fixing the energy level of said coherent light beam at a second level for a read operation;
- first detector means positioned to receive the reflected light from the recording surface of the recording medium at the first of the two spaced-apart spots to provide for read signal;
- second detector means positioned to receive the reflected light from the recording surface of the recording medium at a second of the two spaced-apart spots to provide a verify signal of the write operation when the recording surface at the first spot is positioned at the second spot.

8. The single laser direct read after write system according to claim 7 wherein the two spaced-apart spots are spaced to satisfy $(n+\frac{1}{2})T$ wherein n is an integer and T in the Period of one cycle of the laser in the write operation.

9. The single laser direct read after write system according to claim 7 and further comprising:
- a switchable gain amplifier means connected to receive the verify signal provided by said second detector means and having a low gain during a write operation and a high gain during a read operation;
- delay means connected to said write means for providing a signal which is delayed from the occurrence of a write operation by an amount of time equivalent to the spacing of the first and the second spots; and
- verify decode means for receiving the output of said switchable gain amplifier means and the provided signal from said delay means for providing a verify error signal when a provided signal is received but an amplifier verify signal from switchable gain amplifier is not.

10. The single laser direct read after write system according to claim 9 wherein said delay means delays the provided signal an amount equivalent to $(n+\frac{1}{2})T$, where n is an integer and where T is equivalent to the time of a write cycle.

11. The single laser direct read after write system according to claim 7 wherein said write means is comprised of:
- a write clock source for providing a train of write pulses having a period cycle T; and
- a write signal encoder for receiving the train of write pulses from said write clock source and upon coincidence of a received write signal providing an encoded write operation signal to said laser source to cause said laser to go to said first energy level.

12. A single laser direct read after write system comprising:
- a laser source for providing a first laser beam;
- means for forming two beams from said first beam;
- means for focusing said two beams onto a recording track of a rotatable optical disk at spaced spots;
- write means for switching the energy of said laser source to cause a desired change in the reflective surface of the recording track at one of said spaced spots; and
- means for detecting the reflected light from the recording track at the second of said spaced spots for verifying the desired change in the reflective surface.

* * * * *

UNITED STATES PATENT AND TRADEMARK OFFICE
CERTIFICATE OF CORRECTION

PATENT NO. : 4,949,311

DATED : August 14, 1990

INVENTOR(S) : James A. Barnard

It is certified that error appears in the above-identified patent and that said Letters Patent is hereby corrected as shown below:

Claim 1, Line 4, delete "For", and insert therefor --for--.

Claim 3, Line 6, delete "For", and insert therefor --for--.

Claim 8, Line 4, delete "Period", and insert therefor --period--.

Signed and Sealed this

Fifteenth Day of October, 1991

*Attest:*

HARRY F. MANBECK, JR.

*Attesting Officer*     *Commissioner of Patents and Trademarks*